Jan. 26, 1932.  S. E. WINDER  1,842,812
CONE DISCHARGING APPARATUS
Filed Oct. 27, 1930  2 Sheets-Sheet 2
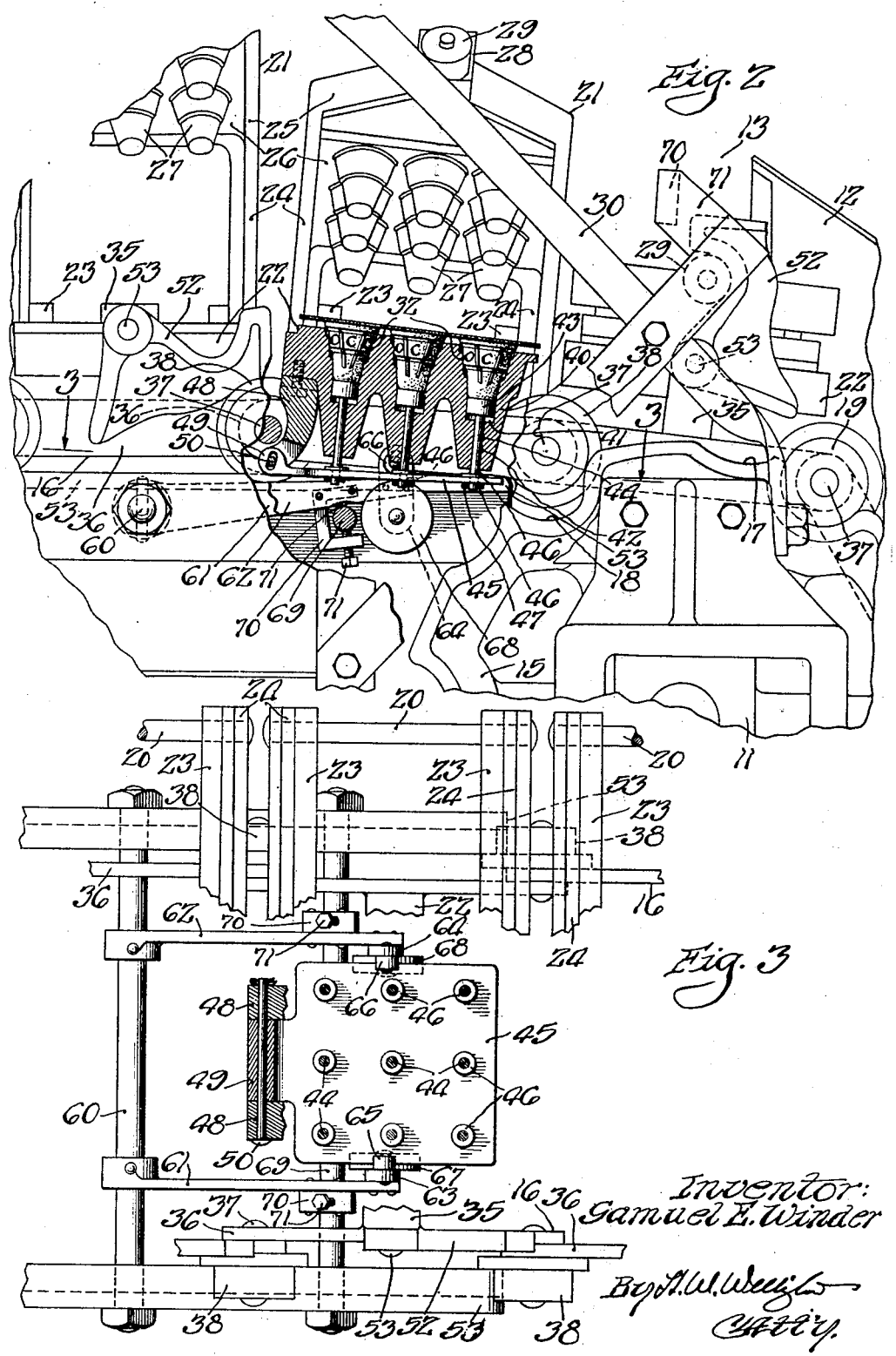
Inventor:
Samuel E. Winder Patented Jan. 26, 1932

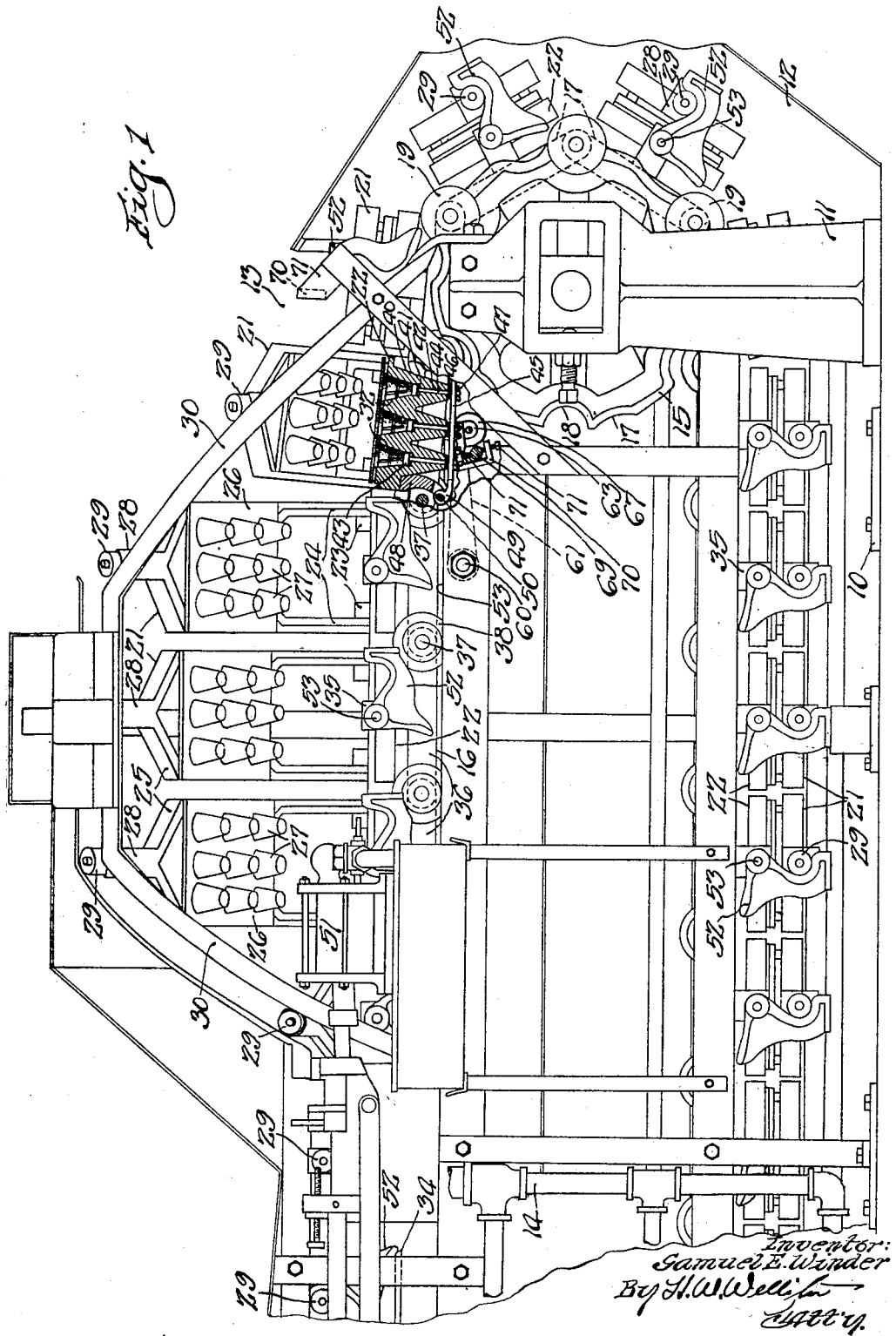

1,842,812

UNITED STATES PATENT OFFICE

SAMUEL E. WINDER, OF CHICAGO, ILLINOIS

CONE DISCHARGING APPARATUS

Application filed October 27, 1930. Serial No. 491,392.

The present invention relates to a cone forming and baking apparatus, and has particularly to do with a means for freeing the baked cones from bake pans or molds.

In the manufacture of cones for the reception of ice cream, difficulty has been encountered from time to time in maintaining the cone material in the bake pans as it is being baked so that they may readily be taken therefrom without undue breakage.

The first great difficulty found was in the fact that cones which are baked in a two-part mold tend to adhere to the top and tiltable portion of the mold and at other times to the bottom portion of such mold. Uniformity of behavior is necessary for the economical operation of any machine.

Means were then devised whereby the cones, as baked, are maintained in the bottom portion of the bake pan when the cover or upper section of the pan is lifted, but difficulty was had in removing the baked cones from such lower section rapidly, economically, and relatively free from breakage. The present invention has to do with a means whereby the cones normally held in the lower section of a bake pan by friction are readily, efficiently, and economically discharged from such section.

The objects of the invention, among others, include the following:

New and novel cone baking equipment adapted to maintain a baked cone in a selected section thereof, in combination with means for efficiently discharging the cone from such section.

New and improved means for freeing bake pans of cooked material.

An improved cone baking pan.

An improved cone cooking apparatus and discharge means therefor.

These objects and such other objects as may hereinafter appear, are obtained by the novel construction, unique arrangement and improved combination of elements illustrated in the accompanying two sheets of drawings, illustrating one form of the invention, and in which:

Figure 1 is a fragmentary side elevation and vertical section of a cone baking apparatus embodying the invention;

Figure 2 is an enlarged elevation, partly in section, of a portion of the apparatus shown in Figure 1; and Figure 3 is a horizontal transverse section taken on the line 3—3 of Figure 2.

Like reference characters are used to designate similar parts in the drawings and in the description of the invention hereinafter given.

For convenience of description, a conventional type of cone baking apparatus will be illustrated and described. The invention is made a part of such conventional apparatus.

Such apparatus comprises a base support 10, endless chain supports 11 in the end thereof, one only being shown, and a shell 12 adapted to surround the major portion of the apparatus and having an opening 13 hereinafter to be referred to. Within the shell 12 and beginning at the left hand side of Figure 1, are gas pipes and burners 14 for the cooking operation within such shell.

At each end of the apparatus, and upon the standards 11 provided therefor, are sprockets 15. About said sprockets 15 an endless chain 16, comprising links 17, is adapted to rotate. Power for driving said sprockets whereby said endless chain may be continuously or intermittently moved in the form of any suitable prime mover is provided.

Each of the sprockets 15 has an irregular serrated or toothed periphery providing two adjacent depressions 17 and 18, the deeper of which, 18, being adapted to seat a roller bearing 19 of which there are a number upon the endless chain 16.

Said chain 16 comprises a plurality of bake pan sections united to form an endless belt. At the closed side of said links are longitudinal side members 20 which provide pintles for the hinging of the upper and lower sections 21 and 22, respectively, of the pans, such sections repeatedly being referred to herein as bake pans or bake pan sections.

Each section, 21 and 22, has two arms, the ends of which are joined by member 20, the arms on the lower section 22 being outside and designated 23 and the arms of the upper section being inside and designated 24. Said upper section 21 includes a frame 25 having thereon a plate 26 from which project male mold members 27, each being to make the interior of a cone. Said frame includes a front arm 28 on which is a roller bearing 29, said bearing being adapted to ride on an angle iron 30 or the like, which provides a track therefor when it is desired to raise section 21 from section 22.

The outer members 23 of the lower section 22 are joined in any suitable manner or integral with said lower section 22 which includes a plurality of female molds 32 which shape the exterior of the cones while molds 27 concurrently shape the interior. The lower section 22 in the endless chain are joined by members 35 to links 36 of the endless chain, said links 36 being tied together at their ends by bolts 37 which bolts provide axles for roller bearings 38. Said bearings 38 are adapted to ride in section 18 of sprockets 15, so that with the rotation of one sprocket 15 by suitable power, the chain 16 is made to move constantly or intermittently, as elected.

Each side of the chain may be similarly constructed and suitable guides for the chain may be provided. Each projecting male mold section registers with a female mold as stated above. Each mold includes a bottom forming section, a lower coniform section, a shoulder forming portion, and a main body section which is also coniform. The latter is topped with a rim forming part. There are grooves in the female mold to form longitudinal ridges on the finished cone whereby to provide frictional engagement between the baked dough in the mold and the wall of such female mold. Such a mold form is specific for insuring the retention of the baked cones in part 22.

As a part of the pan 22, there is beneath each female mold an extension of material. Each extension is designated 40, and therein is a plunger seat 41 and a longitudinal plunger opening 42. The head 43 of a plunger is adapted to be seated in said plunger seat 41. Said plunger includes a rod 44 adapted to extend through extension 40 by way of opening 42.

Beneath the pan 22 is a plate 45. In said plate are as many apertures 46 as there are plunger rods 44. At one side of said plate 45, said plunger rods 44 are secured against longitudinal movement through the plate by a shoulder or washer 46 and at the other side by a cotter pin 47 extending through the plunger rod. Slight play between plate 45 and plunger rods 44 is permitted by this method of fastening.

Movement between the plate 45 and the bake pan mold causes the plunger heads to ride axially of the mold and to dislodge from the mold any solid object in the mold which may rest upon the plunger head 43.

Said plate is associated with the female mold by connection with said plungers and by a bracket 48 depending from mold 22 and comprising arms between which a lug 49 in plate 45 extends, there being an elliptical bore through said lug and said bracket to accommodate a bolt 50 secured in position by a cotter pin. Relative movement may thus be had between said plate and mold within certain limitations, the normal position of the plungers 43 being at the bottom of the female molds.

In the fit of the male and female molds, and pans 21 and 22, there is a relatively thin space intermediate the mold walls whereby to form the wall of the cone. In the upper mold 21 and the lower mold 22 a slightly spaced relationship is arranged to be maintained so that all excess of batter which may be fed into the female molds and which is forced therefrom by the closing of the upper mold section over said lower mold, may spread between said two mold sections to form a thin sheet, which sheet joins the plurality of cones which are baked at one operation together, making it possible to handle all of said cones as a unit when detached from the bake pans.

The female molds are supplied with batter by a suitable batter pump 51, and thereafter the section 21 of the bake pan is closed over section 22 and locked in position by the catch 52 pivoted at 53 on pan 22, said catch being locked into position by contact with an angle iron track 34, which track is extended through the shell and terminates at the right hand side of opening 13 (Figure 1). During all of the travel of the pans about the shell 12, except across opening 13 therein, the plungers 43 are maintained in the bottom of molds 32.

To open the molds, in the open space 13 in the shell 12, heretofore referred to, there is provided at the front side (Figure 1) the cam track 30 in the form of an inverted U, which track is adapted to engage the roller bearing 29 at the end of the upper mold 21. In the course of the rotation of the endless belt comprising links including the bake pans, the rollers 29 on the upper section 21 of the bake pan, engage said cam 30 and by the continued movement of the endless belt, said upper section 21 is adapted to be forced upwardly at an angle to the lower section thus opening the mold pan. Such opening is for a sufficiently long period to allow the discharge of a unit of baked cones from each of the pans 22, their removal from the machine being manual. The reloading of the emptied lower section 22 by the pump 51 carrying the batter, as illustrated in Figure 1 and just described, is accomplished while mold pans 22 and 21 are apart.

In connection with the endless chain, and as previously indicated, there are also angle iron tracks 53 upon which the roller bearings journalled upon the links carrying the bake pans are adapted to ride. In the present invention only the upper angle iron track 53 is of importance. It will be noted from an examination of Figure 2 that such track terminates adjacent to the right hand sprocket 15 but not so close thereto as to prevent, one at a time, of the roller bearings 38 upon the links from following the periphery of the sprocket 15 sufficiently that the plane of the lowermost section of such bearing 38 drops beneath the horizontal plane of said angle iron 53 in the course of travel. As soon as such roller 38 travels a short distance in such ow horizontal plane, it reengages track 53 and is restored to its normal path of travel.

Disposed at the right hand side of Figure 1, is an actuating member for plate 45. Said actuating member includes a transverse shaft 60 to which are secured right and left hand arms 61 and 62, which arms terminate in angular members 63 and 64. The upper portion of said angular members, Figures 1 and 2, carries an axle for a relatively small bearing 65 and 66, while the lower portion of said member carries an axle for a larger roller bearing 67 and 68. The space intermediate adjacent peripheries of said roller bearings 65 and 67, and 66 and 68, is great enough to freely admit opposed edges of the plate 45.

For the purpose of holding the plate engaging bearings in adjusted position, there is provided a second transverse shaft 69. On each of the arms 61 and 62 is a U-shaped adjusting block 70. In each leg thereof is an adjusting screw 71. By moving said screws 71 toward and away from said shaft 69, the correct position for the bearing 65 and 67, and 66 and 68, upon said arms 61 and 62 may be had.

As each link of the endless chain completes an 180 degree movement about the right hand sprocket 15, the roller bearings 38 thereon, in endeavoring to follow the periphery of the sprocket 15 drops below the horizontal plane of the top of the angle iron track 53. This drop is had after the top section 21 of the bake pan is partially opened by engagement of the bearing 29 on said top 21 with one leg of the U-shaped cam 30.

Further movement of the chain causes the bearings 38 to engage the rounded end of the angle iron track 53. The bake pan by reason of the dropping of successive bearings 38 in the manner indicated is made to rock. As the roller 38 passes the plate engaging members, the edges of a plate 45 pass between said members. The rollers 38 in advance continue to maintain their horizontal position but the rollers following in their endeavor to follow the periphery of the sprocket 15 drop below the level of the track 53. This movement causes the plungers, which are being maintained in a fixed horizontal plane, to move away from the bottom of the mold, the movement in the apparatus being of the mold 21 away from the plate 45 rather than of the plate 45 from the mold 32. The plate 45 maintains a fixed horizontal plane. Each of the plungers 43 is thus caused to free from the mold by the movement of the mold relatively thereto the cones which are baked in the mold.

Such relative movement between the plate 45 and the mold ejects the cones as a unit, joined as they are by the web therebetween, permitting of the operator in attendance upon the machine removing the nine, or other number of cones that are in such unit, by grasping the web section between the individual cones.

Each link as it passes through the section of the machine illustrated in Figures 2 and 3, is similarly treated, and the cone material in its baked condition is dislodged from the lower section 22, of the bake pan wherein it is lodged because of the friction in the cone material upon the female section of the mold. In order to insure proper cooperation between the mold plate and the mold, it is necessary to secure proper adjustment for each arm of the plate engaging device. The elliptical aperture for the bolt 50 is adapted to provide the necessary play between the plate 45 and the lower section 22 of the bake pan to allow for the relative movement therebetween, hereinabove described.

After passing the unloading position, the plate 45 drops to its lowermost position pulling the plungers to the bottom of their recesses. Should the weight of the plate 45 itself not bring about this result, then the pressure of the upper section 21 of the pan upon the material in the lower section 22, will cause such plate 45 to drop. Said plate is held in such extended position during the entire rotation of the device and until the discharging position is attained.

As previously stated, upon each lower section of the mold is a lug which is adapted to journal a latch. Said latch has something of the shape of the letter S. It is pivotally supported upon said lower section 22 of the mold and after the lower section of the mold has been filled with material and the upper section returned to a position enclosing said lower section of the mold, said latch member is forced into the position of locking the upper and lower sections together by the engagement with an angle iron track, the end of which is illustrated at the extreme left hand end of Figure 1.

Said latch remains in a closed position during the entire travel of the chain until the opening 13 in the shell 12 is reached, when by engagement of said latch upon a lug 70 into the frame section 71, said latch is pushed from the locking position just prior to the instant when the roller bearing 29 at the end of the upper bake pan 21 engages the U-shaped track 30 whereby said upper pan 21 is lifted away from the lower pan 22.

I claim:

1. A cone baking device comprising an endless chain of bake pans, each of said pans having a plurality of mold sections, plungers in the bottom of each of said mold sections, a plate connected to the plungers in each of said pans, means on said apparatus for maintaining said plate in a horizontal plane, and means for causing said mold to be rocked relatively to said plate while said plate is so held.

2. A cone baking device comprising an endless chain of bake pans, each of said pans having a plurality of mold sections, plungers in the bottom of each of said mold sections, a plate connected to each of said plungers on each of said pans, means on said apparatus for guiding said plate in a horizontal plane, and means for causing said mold to be rocked while said plate is so held.

3. A cone baking device comprising an endless chain of bake pans, each of said pans having a plurality of mold sections, plungers in the bottom of each of said mold sections, a plate connected to each of said plungers in each pan, means on said apparatus for maintaining said plate in a horizontal plane, and means comprising a sprocket for said chain and a track therefor for causing said pans to be rocked relatively to said plate while said plate is so held.

4. A cone baking device comprising an endless chain of bake pans, each of said pans having a plurality of mold sections, plungers in the bottom of each of said mold sections, a plate connected to each of said plungers, means on said apparatus for maintaining said plate in a horizontal plane, comprising roller bearings, and means for causing said mold to be rocked relatively to said plate when engaged by said roller bearings.

SAMUEL E. WINDER.